United States Patent
Baker (10) Patent No.: US 6,321,843 B2
(45) Date of Patent: *Nov. 27, 2001

(54) PRELOADING TYPE CONNECTOR

(75) Inventor: Gerald Baker, Houston, TX (US)

(73) Assignee: Cooper Cameron Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,481

(22) Filed: Jul. 23, 1998

(51) Int. Cl.[7] .................................................. E21B 33/038
(52) U.S. Cl. ............................ 166/344; 285/18; 285/309; 166/91.1
(58) Field of Search .................................. 166/91.1, 344, 166/339; 285/18, 309

(56) References Cited

U.S. PATENT DOCUMENTS

| | | | |
|---|---|---|---|
| 4,068,865 | * 1/1978 | Shanks, II | 285/90 |
| 4,114,928 | * 9/1978 | Lochte | 285/18 |
| 4,209,193 | * 6/1980 | Ahlstone | 285/309 |
| 4,712,621 | 12/1987 | Wightman, et al. | 166/382 |
| 4,848,472 | * 7/1989 | Hopper | 166/344 |
| 4,962,952 | * 10/1990 | Pallini, Jr. et al. | 285/24 |
| 5,066,048 | 11/1991 | Farrell | 285/18 |
| 5,163,514 | 11/1992 | Jennings | 166/368 |
| 5,247,996 | 9/1993 | Milberger | 166/348 |
| 5,259,459 | * 11/1993 | Valka | 166/345 |
| 5,273,117 | 12/1993 | Reimert | 166/348 |
| 5,775,427 | * 7/1998 | Skeels et al. | 166/344 |
| 5,971,076 | * 10/1999 | Taylor et al. | 166/368 |

* cited by examiner

Primary Examiner—Hoang Dang
(74) Attorney, Agent, or Firm—Michael P. Hartmann; Peter A. Bielinski (57) ABSTRACT

A connection for oilfield use is disclosed. It features male and female components held together by dogs actuable through one of the members and into the other. Different configurations of the connections envision a built-in preload to the connection when made-up. This is accomplished by a cantilevered component at the extremity of one of the components of the connection. Alternatively, the preload feature can be incorporated into the dog or other locking assembly that holds the components of the connection together. The connection is particularly useful in subsea chokes which have a removable insert which can be mounted to or removed from the choke body which is located subsea.

13 Claims, 6 Drawing Sheets

PRELOADING TYPE CONNECTOR

FIELD OF THE INVENTION

The field of this invention relates to connectors which hold two components together with a preload and more particularly a subsea choke using such a connection for a removable insert.

BACKGROUND OF THE INVENTION

Oilfield applications involve high pressures as well as fluctuating flows and pressures. Thus, when connections need to be made, they need to be able to withstand a variety of different conditions. In the past, various designs incorporating preload into connections have been used. Generally speaking, these connections would involve a tapered ring powered by a hydraulic cylinder or cylinders which would be pulled down on collets having a tapered exterior so as to force the collets against the two pieces being joined. The two pieces would have flanges which would be held together by an internal groove in the collets. Typical of such designs are the model 70 and the high-capacity (HC) collet connectors offered by Cooper Cameron. The high-capacity connector would allow for a preload of 7 million lbs. for 18¾" connections having a 15,000 psi working pressure. One of the drawbacks of such connectors is that they are expensive to construct and their large size makes their assembly in the field more cumbersome. Additionally, such designs require the use of tapered locking surfaces which depend on friction to remain locked. Lubricating components which can appear on the taper of the lock ring or on the outer surface of the collet segments can act to undermine the connection, causing a potential for leakage.

Other designs involving preload in a connection in oilfield use are illustrated in U.S. Pat. Nos. 5,066,048 and 5,247,996. Other connections for subsea use involving the use of dogs in grooves are shown in U.S. Pat. Nos. 5,273,117; 5,163,514; and 4,712,621.

Subsea chokes have been designed with retrievable inserts. The choke body is generally mounted to the Christmas tree or manifold and the insert is a unitized trim cartridge and actuator assembly which can be retrieved to the surface, leaving the choke body subsea. A crown-type connector has been used in such subsea chokes. This design involves a single-piece cylindrical collet with slots machined to form locking fingers. The insert would be pushed into a receptacle and the collet fingers would then move outwardly into an internal groove in the choke body. The operating principle for obtaining the preload in these subsea chokes was similar to the principles relied upon in U.S. Pat. No. 5,066,048. However, the drawback of this design for a retrievable subsea choke was that it was very expensive to manufacture and its large size made it difficult to manipulate it into position in the choke body which remained subsea.

What is desirable is a connection which could provide the requisite preload in subsea choke while being small and cheaper to manufacture. The preload requirement functionally eliminated in the past the use of dog-in-window or groove-type designs, split rings or other types of connectors that didn't have a tapered fit between a locking piston and a locking element.

What was desired and is an objective of the present invention is to provide a simple connection which can give the necessary amount of preload, while combining that design into a compact assembly which would significantly reduce costs compared to previous designs and greatly facilitate installation. Thus, the compactness of the design becomes significant in some instances where room for the connector and actuator for a removable choke insert assembly is in limited supply. Additionally, a more lightweight connector can be more easily manipulated subsea for connection or removal. Another objective was to mount the moving components of the connection on the actuator assembly so that such components do not remain subsea when the connection is undone and the choke insert is removed. While the various configurations of connections are illustrated in this application specifically for a choke with a removable insert, those skilled in the art will appreciate that the objective of the present invention is to provide a connection which can be used in well operations or other applications in the oil and gas industry. Those and other objectives of the present invention will become apparent to those skilled in the art from a review of the description of the preferred embodiment below.

SUMMARY OF THE INVENTION

A connection for oilfield use is disclosed. It features male and female components held together by dogs actuable through one of the members and into the other. Different configurations of the connections envision a built-in preload to the connection when made-up. This is accomplished by a cantilevered component at the extremity of one of the components of the connection. Alternatively, the preload feature can be incorporated into the dog or other locking assembly that holds the components of the connection together. The connection is particularly useful in subsea chokes which have a removable insert which can be fixedly or removably mounted to the choke body which is located subsea.

DETAILED DESCRIPTION OF THE PREFERRED EMBODIMENT

Figure 1:
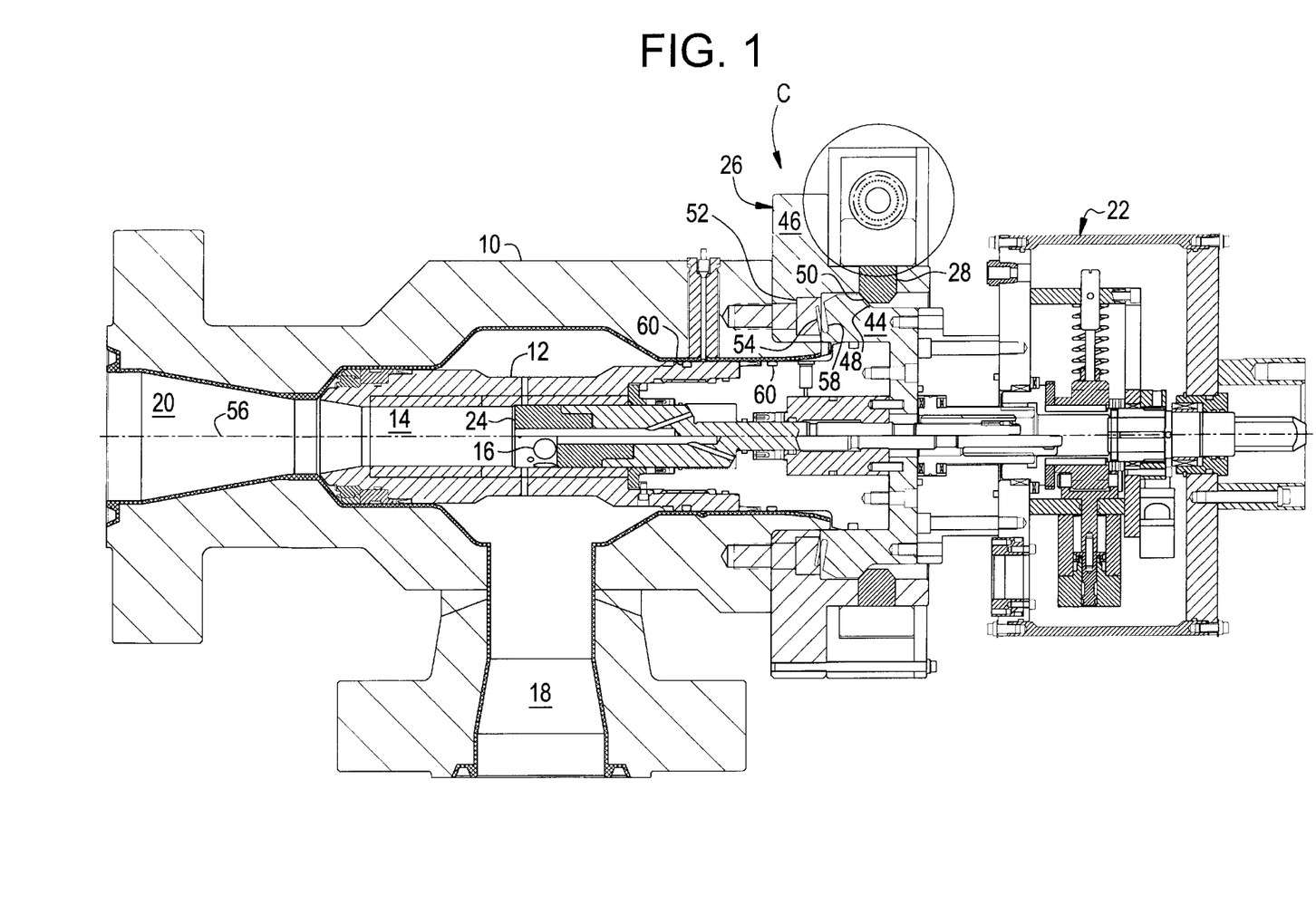
FIG. 1 is a sectional elevational view of one form of the connection in assembled form.

Referring to FIG. 1, a choke body 10 which is usable in subsea applications is illustrated. The choke body 10 accepts an insert 12. Inside of insert 12 is bore 14 which communicates through openings 16 to the inlet 18 of the choke body 10. Bore 14 communicates to outlet 20 of the choke body 10. An actuator 22 moves plug 24 between the two positions shown in the split view of FIG. 1. In the upper position, the openings 16 are exposed, allowing the choke to operate to reduce pressure between inlet 18 and outlet 20. In the lower position shown at the top of FIG. 1, the plug 24 covers the opening 16 and there is no flow from inlet 18 to outlet 20 in the choke body 10.

Figure 6:
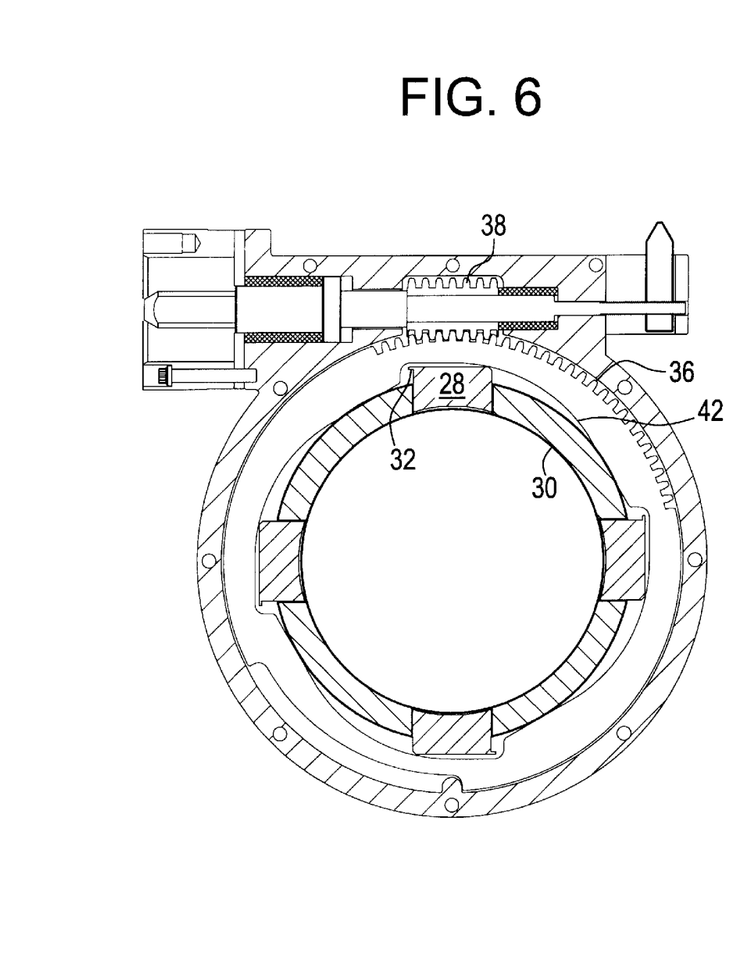
FIG. 6 is a plan view of the dog-actuating mechanism of FIGS. 1 or 2 with the dogs retracted.
Figure 7:
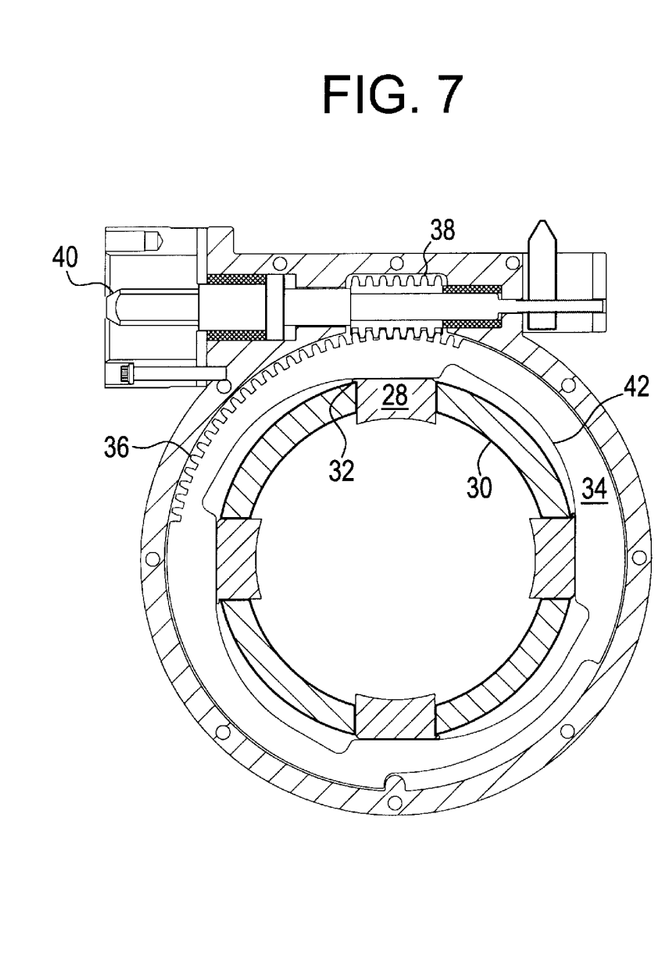
FIG. 7 is the view of FIG. 6 with the dogs extended for securing the connection.

In the embodiment of FIG. 1, the choke body 10 further comprises a dog-operating mechanism 26, which is also shown in FIGS. 6 and 7. A series of dogs 28 extend through openings in a sleeve 30 and are retained by a tab 32 to keep them from being pushed all the way in through sleeve 30. A cam 34 has teeth 36 which mesh with teeth 38 which are, in turn, rotatable by rotation of shaft 40. Shaft 40 is configured so that it can be gripped by a remotely operated vehicle (ROV) for actuation subsea. Those skilled in the art will appreciate that rotation of shaft 40 rotates cam 34 from the position shown in FIG. 6 to the position shown in FIG. 7 and vice versa. By virtue of profiles 42, the dogs 28 are pushed inwardly, as shown in FIG. 7, or allowed to be pushed back to the position shown in FIG. 6 for disconnection of the connection C.

The connection C as shown in FIG. 1 has a male component 44 which is insertable into female component 46. Male component 44 has a tapered or sloping shoulder 48. Dogs 28 have a sloping shoulder 50 matching the orientation of shoulder 48. FIG. 1 shows the male component 44 fully inserted into the female component 46, with the dogs 28 extended so that sloping shoulders 48 and 50 are in contact. The female component 46 has an internal shoulder 52. The male component 44 has a cantilevered component 54, shown schematically in FIG. 1. In actuality, the cantilevered component 54 bottoms on internal shoulder 52. The cantilevered component extends obliquely with respect to the longitudinal axis 56 of the choke body 10. In the preferred embodiment, the orientation of the cantilevered component 54 is within a range of substantially perpendicular to axis 56 to an offset of approximately 75° from axis 56. The cantilevered component has the appearance of a U-shape in cross-section as shown in FIG. 1. When the male component 44 is fully inserted into the female component 46 and the dogs 28 are extended, the cantilevered component 54 bottoms on shoulder 52, thus bringing it closer to or even in contact with surface 58 under certain conditions. Those skilled in the art will appreciate that the cantilevered component 54, when bottomed on shoulder 52, gives preload to the connection C. Thus, uncertainties about the amount of extension radially toward axis 56 of dogs 28 becomes irrelevant since sufficient extension of dogs 28 radially inwardly towards axis 56 will cause the sloping shoulders 48 and 50 to contact sufficiently to force the cantilevered component 54 against the internal shoulder 52, while at the same time locking the connection C together so as to prevent the male component 44 from being blown out of the female component 46.

The configuration and location of the cantilevered component 54 can vary without departing from the spirit of the invention. The orientation of the cantilevered component 54 can also vary without departing from the spirit of the invention. The compliant portion of one of the male 44 or female 46 components can be anywhere on its length as long as it is energized by bringing the components together and holding them together with a locking assembly, such as dogs 28. As long as at least one of the male and female components has a compliant segment that elastically deforms when the components are brought together, the benefits of the present invention are achieved. The compliant segment can be on both components of the connection C.

In the embodiment shown in FIG. 1, the dog-operating mechanism 26 is a part of the choke body 10 and, thus, remains subsea, even if the actuator 22 is removed with insert 12 after the dogs 28 are retracted by an ROV or a diver.

Figure 2:
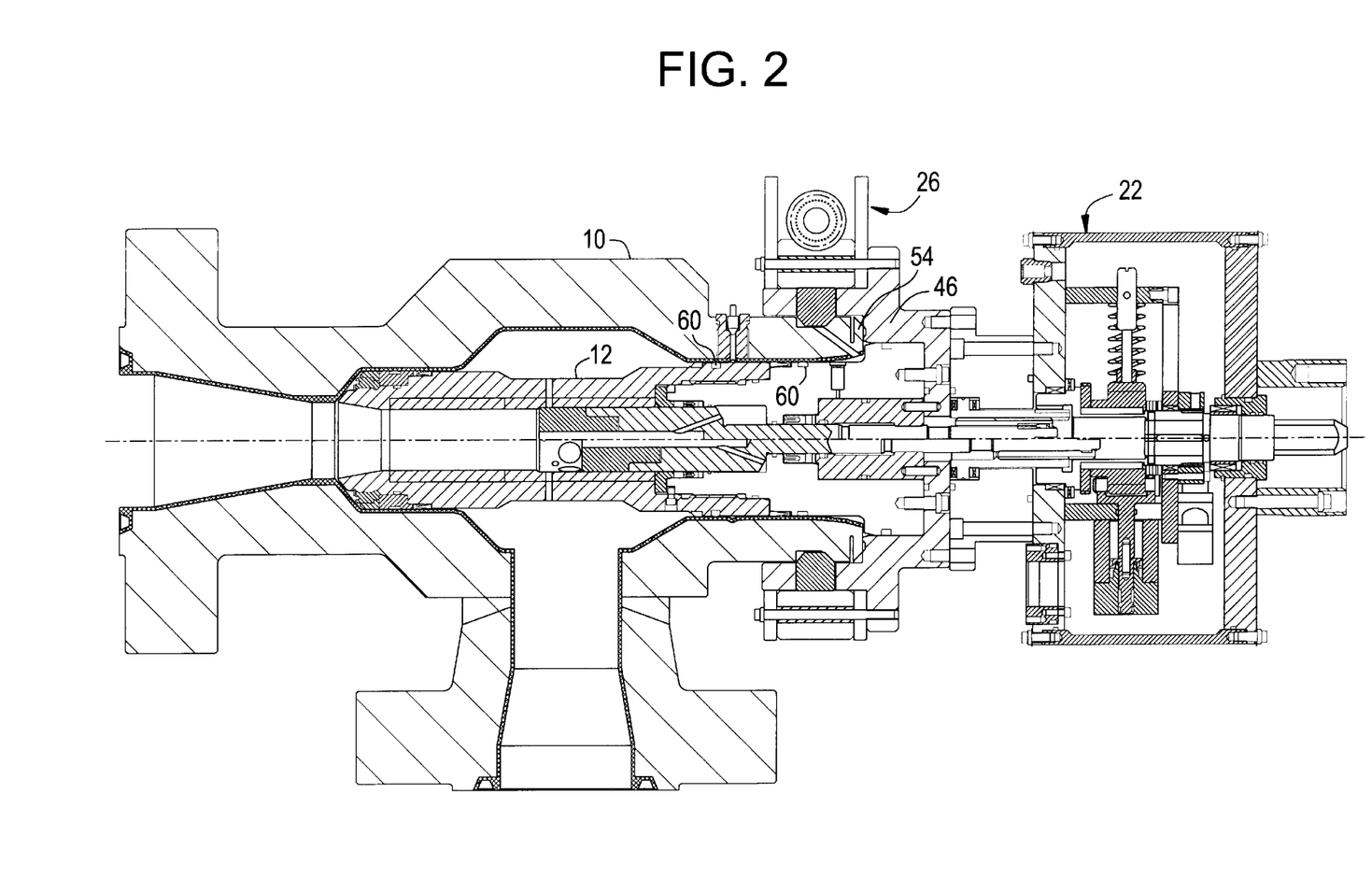
FIG. 2 is a sectional elevational view of another form of the connection, illustrating an embodiment with the dog mechanism removable with the actuator.

An alternative preferred design allowing the dog-operating mechanism 26 to be removed from the choke body 10 is illustrated in FIG. 2. The principle of operation is the same as in FIG. 1, except that the compliant cantilevered component 54 is now part of the choke body 10. In the embodiment of FIG. 1, the choke body 10 had an internal shoulder 52. In FIG. 2, the internal shoulder on the choke body is eliminated, and the cantilevered component 54 represents the end of the choke body 10. The difference is that the dog-operating mechanism 26 is now a portion of the female component 46 which is connected to the actuator 22. In the FIG. 1 embodiment, the male component 44 was connected to the actuator 22. In essence, this reversal of orientations between FIGS. 1 and 2 operates functionally the same, the difference being that when the actuator 22 is removed with the insert 12, the dog-operating mechanism 26 comes away from the choke body 10 with the insert 12. In either case of FIGS. 1 or 2, the flexing or compliance of the cantilevered or preload component 54 allows the preload to be built into the assembled connection C locked together by dogs 28. As a clear juxtaposition to prior art designs which involved tapered cones pushing on collets where the amount of movement of the tapered cone plus reliance on residual frictional forces were required to hold the connection together, the connection C of the present invention is far simpler and cheaper to build and takes up less space. It is also not dependent on residual friction forces to hold the connection together. The connection stays together with preload as desired as long as sufficient radial inward movement of the dogs 28 occurs to prevent the male and female components 44 and 46, respectively, from coming apart. Accordingly, there's no continuing wedging action required to maintain the preload on the connection. The preload occurs because of sufficient extension of the dogs 28 which, in turn, flexes or moves the preload or cantilevered component 54 sufficiently against an opposing member of the connection or internally within one component of the connection so as to retain a preload force when required. It should be noted that the preload is generally necessary when conditions of high flow and low pressure occur which could create chattering in the connection due to clearances inherent in dog-type closures. Additionally, in view of the fact that radial seals 60 are shown in the embodiments of FIGS. 1 and 2, there is less of a requirement of a longitudinal closing force on the connection to activate the seals. Thus, it is the fit between the insert 12 and the passage in the choke body 10 which provides the necessary configuration to retain differential pressures across the seals 60. The dogs 28 acting on shoulders 48 are for the purpose of holding the connection together and providing preload as opposed to loading up these particular types of seals. However, other types of seals (i.e., face seals) can be used with this type of a connection without departing from the spirit of the invention.

The compliant component 54 need not be cantilevered; it can be a segment of the male 44 and/or female 46 components which can bend, fold, crumple or otherwise deform elastically under load created by actuating the closure, one type of which can be dogs 28.

Figure 3:
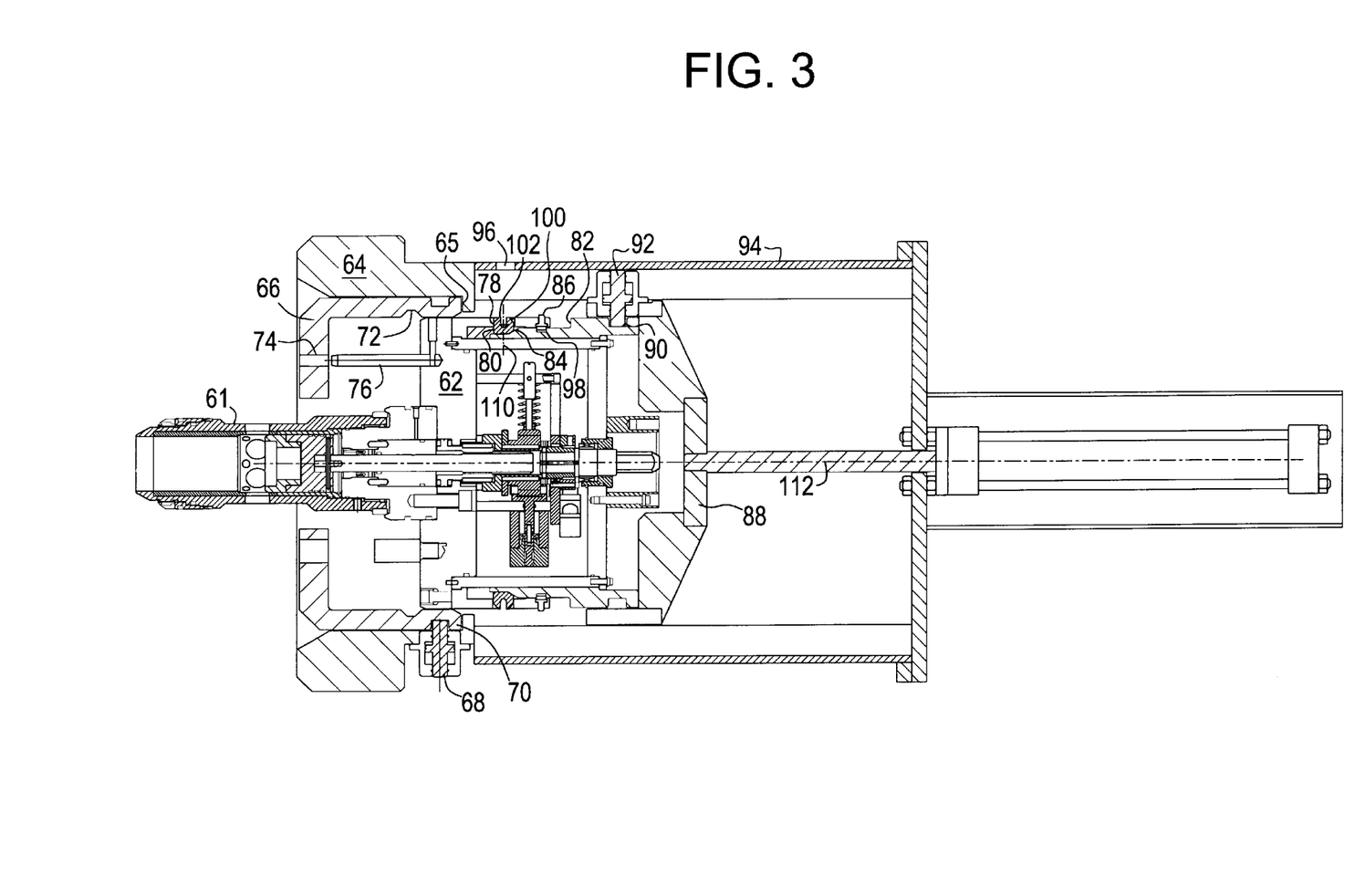
FIG. 3 is a sectional elevational view of an alternative embodiment illustrating the preload feature in the dogs in the run-in position.
Figure 4:
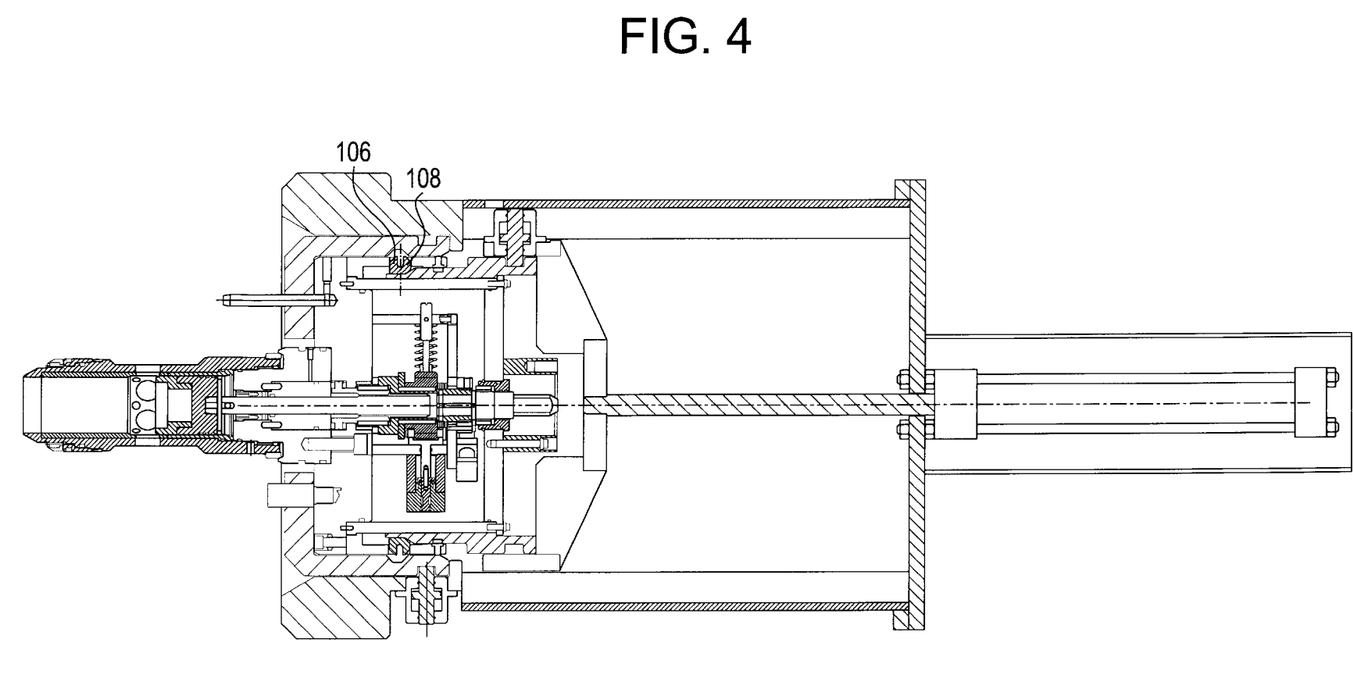
FIG. 4 shows the view of FIG. 3 with the dogs aligned with opposing grooves.
Figure 5:
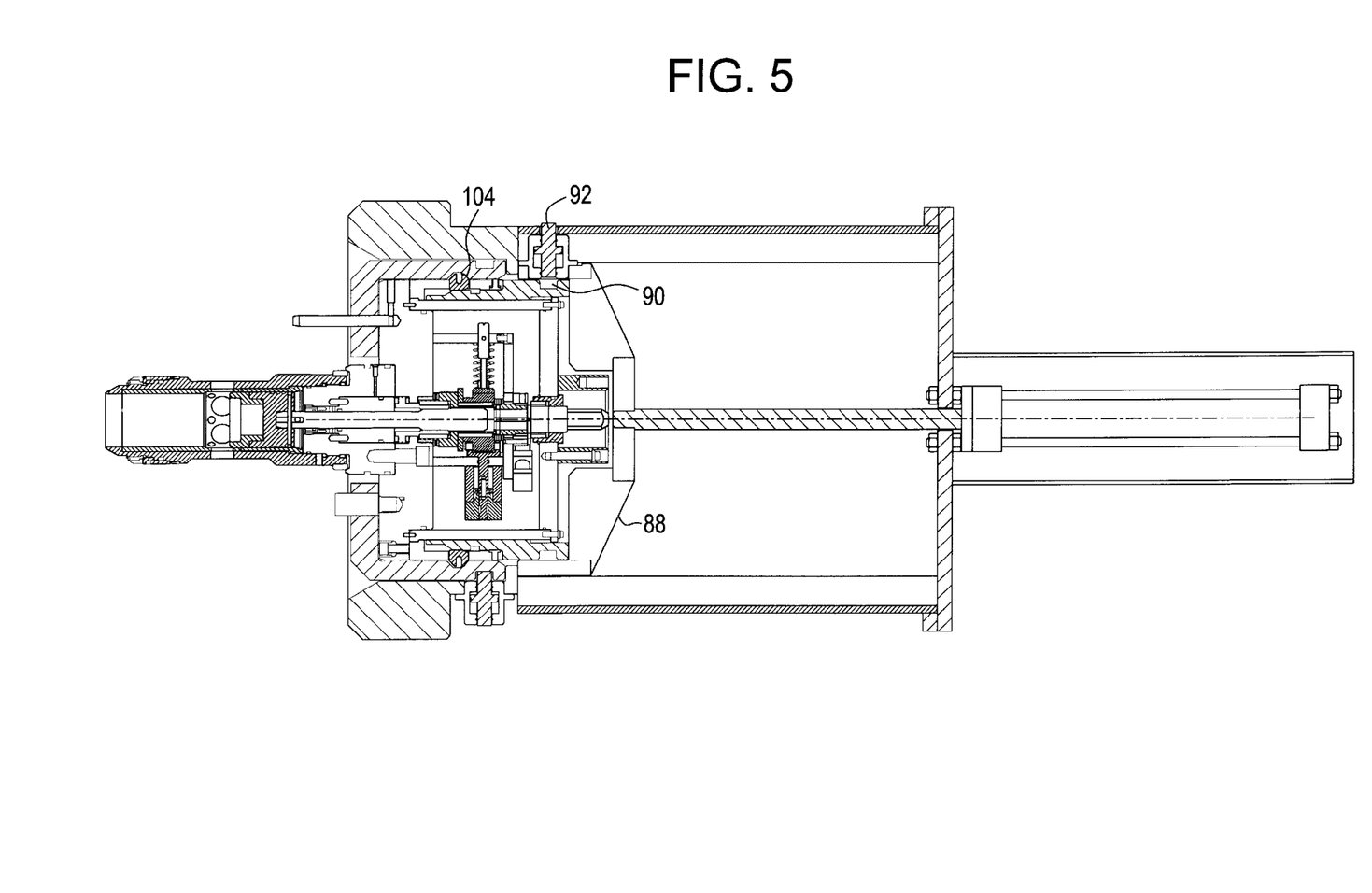
FIG. 5 is the view of FIG. 4 with the dogs cammed into the opposing grooves to complete the joint.

An alternative embodiment is illustrated in FIGS. 3–5. In the embodiment illustrated in these figures, the concept of a preload on the connection and the dogs which hold the connection together or allow it to be taken apart are combined. Referring to FIG. 3, a choke insert 61 is attached to an actuator 62. The running tool 88 has as a part thereof sleeve 94 and skirt 64. Shoulder 65 on skirt 64 lands on choke body 64 as long as pin 68 is in a retracted position (not shown). Thus, pin 68 retains the running tool 88 to choke body 66 when it extends into groove 70. The choke body 66 is partially shown in FIG. 3. Pin 68 can be mechanically or hydraulically actuated. Choke body 66 has peripheral internal groove 72 and a series of alignment holes 74 which accept alignment pins 76. Alignment pins 76 extend from actuator 62. Actuator 62 has a series of peripheral openings 78, in each of which is located a generally U-shaped dog 80. Behind each of the dogs 80 is a sleeve 82, which has a taper 84. A split ring 86 holds the sleeve 82 to the actuator body 62 during run-in. Run-in is accomplished using a running tool 88 which engages a groove 90 using a schematically illustrated pin 92, which can be mechanically or hydraulically operated. The running tool 88 has an extension sleeve 94 such that pin 92 cannot be retracted out of groove 90 until it is in alignment with opening 96 of sleeve 94, as shown in FIG. 5. This prevents inadvertent release subsea of the actuator 62 and insert 61. The actuator 62 enters choke body 66 with pins 76 guiding the advancement as they move into openings 74. Eventually, the actuator 62 bottoms in choke body 66 as shown in FIG. 4. At that point, sufficient setdown weight moves split ring 86 into groove 98 of sleeve 82, thus allowing sleeve 82 to continue moving downwardly, thereby camming the dogs 80 radially outwardly into groove 72 due to the action of tapered surface 84.

This final position is shown in FIG. 5. Depending on the configuration of the dogs 80 and the groove 72, the amount of movement of legs 100 and 102 determines how much preload is on the connection between the actuator 62 and the choke body 66. It is within the scope of the invention to allow the legs 100 and 102 to touch during normal operations. Thus, for example, when high internal pressures are developed in the choke body 64, the legs 100 and 102 will likely touch each other. However, when there is high flow and low pressure, the legs will be apart as a preload force is applied. Optionally, within the recess defined between legs 100 and 102, small projections can be used on each or at least one of the legs 100 and 102 which will limit the amount of movement of the legs 100 and 102 toward each other during operation of the choke. These projections 104 are illustrated in FIG. 5.

It should also be noted that when the sleeve 82 reaches its full downward movement as the split ring 86 is forced into groove 98, the pin 92 comes into alignment with opening 96 in sleeve 94. Thus, with the pin 92 no longer in groove 90, the running tool 88 can be retrieved.

Those skilled in the art will appreciate that the drawings of FIGS. 3–5 illustrate one possible way of configuring the connection for application of a predetermined amount of preload. However, the actual construction of the actuator 62 insofar as how it operates the insert 60 is not a portion of the invention and is a design known in the art. The significant feature of the embodiment shown in FIGS. 3–5 is that preload is applied to a connection where the preload function and the locking function of the connection are combined in a single element.

Another feature of the invention illustrated in FIGS. 3–5 is the elimination of tapered cones acting on collets which left uncertainties as to the solidity of the connection in that reliance on residual friction forces was required. In the embodiment of FIGS. 3–5, sufficient sleeve movement to cam the dogs 80 outwardly into a groove 72 of predetermined configuration ensures the locking of the connection together with the desired preload. It should be noted that groove 72 has a cross-sectional shape in general conformance with the tapered surfaces 106 and 108 on legs 102 and 100, respectively. While a U-shaped cross-section is shown for the dogs 80, other configurations for the dogs can be used without departing from the spirit of the invention. The dog or dogs 80 can have some other shape as long as they also have a compliant component (ie., that bends, folds, crushes, or otherwise changes in dimension) that elastically deforms while at the same time serving to lock the connection components together. While the orientation of the long axis of the dogs 110 is perpendicular to the axis 112, different orientations of the dogs 80 can be used without departing from the spirit of the invention. As long as the dogs 80 can effect a straddle between the actuator 82 and the receptacle 66 so as to hold the connection together, while at the same time changing its configuration elastically so as to provide a preload, the physical embodiment of how those features are executed are all within the purview of the invention.

By integrating the compliant component 54 into a male 44 and/or female 46 portion of the joint, the installation and removal is simpler and faster as compared to using a separate element to achieve the preload which is independent of the constituent parts.

Those skilled in the art will appreciate that connections for services other than for subsea chokes with removable inserts are envisioned for the present invention and that the limits are well beyond chokes or even subsea equipment or even oilfield equipment in general.

The foregoing disclosure and description of the invention are illustrative and explanatory thereof, and various changes in the size, shape and materials, as well as in the details of the illustrated construction, may be made without departing from the spirit of the invention.

What is claimed:

1. A connector, comprising:
    a male component insertable into a female component:
    a compliant portion of one of said male and female components which elastically moves to apply a preload directly to the other of said male and female components due solely to said male and female components being brought together prior to the application of external loads;
    a non-resilient lock mechanism extending at least in part into said male and female components to selectively hold them together with said compliant portion applying said preload.

2. The connector of claim 1, wherein:
    said compliant portion is located near an end of one of said male and female components.

3. The connector of claim 2, wherein:
    said compliant portion further comprises a cantilevered component.

4. A connector, comprising:
    a male component insertable into a female component;
    a compliant portion on one of said male and female components which elastically moves to apply a preload when said male and female components are assembled to each other;
    a lock mechanism extending at least in part into said male and female components to selectively hold them together with said compliant portion applying said preload;
    said compliant portion is located near an end of one of said male and female components;
    said compliant portion further comprises a cantilevered component;
    said male and female components having a longitudinal axis, said cantilevered component extending in a direction transverse to said longitudinal axis of said male and female components.

5. The connector of claim 4, wherein:

said cantilevered component is oriented in a range of about 75–90° from said longitudinal axis.

6. The connector of claim 4, wherein:

said cantilevered component extends around the entire periphery of one of said male and female components.

7. The connector of claim 6, wherein:

said cantilevered component is on said male component.

8. The connector of claim 6, wherein:

said cantilevered component is on said female component.

9. The connector of claim 6, wherein:

said cantilevered component is on said male and said female components.

10. The connector of claim 4, wherein:

said locking mechanism comprises at least one dog extendable into a locking position in said male and female components to lock them together;

said extension of said dog into said locking position acts to put a force on said cantilevered component so that a preload force acts on said male and female components when held together.

11. The connector of claim 10, wherein:

said locking mechanism comprises a cam system actuable by shaft rotation.

12. The connector of claim 11, wherein:

said male component is a portion of a subsea choke body, said female component is connected to an actuator assembly which operates an insert in said choke body;

said locking mechanism is mounted to said female component so that it and said actuator can be removed from a subsea mounted choke body.

13. The connector of claim 11, wherein:

said female component is a portion of a subsea choke body, said male component is connected to an actuator assembly which operates an insert in said choke body;

said locking mechanism is mounted to said female component so that it remains with said choke body when said actuator assembly and said insert attached to it are removed from the choke body mounted subsea.

* * * * *